United States Patent [19]

Carmean et al.

[11] Patent Number: 5,630,107
[45] Date of Patent: May 13, 1997

[54] SYSTEM FOR LOADING PLL FROM BUS FRACTION REGISTER WHEN BUS FRACTION REGISTER IS IN EITHER FIRST OR SECOND STATE AND BUS UNIT NOT BUSY

[75] Inventors: Douglas Carmean; Kathakali Debnath, both of Beaverton; Roshan Fernando, Portland; Robert Krick, Beaverton; Keng Wong, Portland, all of Oreg.

[73] Assignee: Intel Corporation, Santa Clara, Calif.

[21] Appl. No.: 210,066

[22] Filed: Mar. 16, 1994

Related U.S. Application Data

[63] Continuation of Ser. No. 954,872, Sep. 30, 1992, abandoned.

[51] Int. Cl.$^6$ .................................................. G06F 1/04
[52] U.S. Cl. .......................... 395/560; 395/750; 395/800; 395/556; 364/240; 364/270.3
[58] Field of Search .................................. 395/550, 750, 395/800; 364/270.3, 240

[56] References Cited

U.S. PATENT DOCUMENTS

| | | | |
|---|---|---|---|
| 3,582,810 | 6/1971 | Gillette | 331/110 |
| 3,696,338 | 10/1972 | Preiss | 346/172.5 |
| 4,143,418 | 3/1979 | Hodge et al. | 395/250 |
| 4,438,490 | 3/1984 | Wilder, Jr. | 395/184.01 |
| 5,018,170 | 5/1991 | Wilson | 375/120 |
| 5,025,387 | 6/1991 | Frane | 364/493 |
| 5,117,443 | 5/1992 | Shires | 375/111 |
| 5,125,088 | 6/1992 | Culley | 395/500 |
| 5,133,065 | 7/1992 | Hotta et al. | 395/550 |
| 5,319,771 | 6/1994 | Takeda | 395/550 |
| 5,319,772 | 6/1994 | Hwang | 395/550 |
| 5,349,544 | 9/1994 | Wright et al. | 364/600 |
| 5,381,542 | 1/1995 | Curlson | 395/550 |
| 5,381,543 | 1/1995 | Blomgren et al. | 395/550 |
| 5,426,755 | 6/1995 | Yokouchi et al. | 395/428 |
| 5,537,581 | 7/1996 | Conary et al. | 395/550 |

*Primary Examiner*—Thomas C. Lee
*Assistant Examiner*—Anderson I. Chen
*Attorney, Agent, or Firm*—Blakely, Sokoloff, Taylor & Zafman

[57] ABSTRACT

A micro processor including a bus fraction register with an encoding which when decoded indicates either a bus fraction encoding or a stop clock function, data processing logic that includes a number of units including a bus unit, arranged as an instruction pipeline. The units are clocked by an internal clock running at a first frequency and operating with an I/O bus clocked by an I/O clock running at a second frequency which is a fraction of the first frequency. A stop clock signal is generated upon the condition that the bus fraction register contains the stop clock encoding. A bus unit busy (BBSY) signal line is polled to ensure that all pending bus cycles in the pipeline are completed, the polling being initiated in response to the stop clock signal. A special cycle encoded to indicate the stop clock function is run to inform the units of the microprocessor that the internal and I/O clocks are going to stop toggling. The internal and I/O clocks are signaled to stop in response to a NOP micro instruction placed in the pipe line, that indicates that the pipeline is clear of pending instructions. A number of NOPs are executed, the number being determined by the amount of time required by the I/O clock to stop.

21 Claims, 3 Drawing Sheets

SYSTEM FOR LOADING PLL FROM BUS FRACTION REGISTER WHEN BUS FRACTION REGISTER IS IN EITHER FIRST OR SECOND STATE AND BUS UNIT NOT BUSY

This is a continuation of Ser. No. 07/954,872 filed Sep. 30, 1992, now abandoned.

CROSS-REFERENCE TO RELATED APPLICATIONS

Copending patent application Ser. No. 07/954,871 entitled "Fractional Speed Bus Coupling" of Roshan Fernando et al. filed Sep. 30, 1992, now U.S. Pat. 5,471,587, granted Nov. 28, 1995 and assigned to Intel Corporation, the assignee of the present invention.

BACKGROUND OF THE INVENTION

1. Technical Field

The present invention relates to data processing systems, and more particularly to a method and apparatus for changing bus speed fractions on a bus that operates at a fraction of a microprocessor core frequency.

2. Background Art

The above reference U.S. Pat. No. 5,471,587 of Roshan Fernando et al. provides a bus timing apparatus that operates in fractional speed modes without inserting extra clock cycles or by adding wait states. This bus liming apparatus will find use in future IBM Personal Computers that are marketed to various market segments at price/performance levels that are related to various clock speeds at which the microprocessor operates, at proportionally increasing prices. The clock speed determines the kinds of peripheral devices, such as printers and monitors, and memory devices that can be used with the base machine. The above referenced U.S. Pat. No. 5,471,587 of Roshan Fernando et al. discloses a bus timing apparatus that couples internal higher speed buses with slower external busses operating at a fraction of the internal bus frequency. This bus timing apparatus enables a slower I/O device or memory module to match the higher speeds of the microprocessors. In order for such a bus timing apparatus to be commercially viable, it is necessary that a user be able to change bus speed or stop and start the clock without having to reset the computer.

It is therefore desirable to provide a method and apparatus for changing bus speed fractions and slopping and restarting a clock on a bus that operates at a fraction of the microprocessor core frequency.

SUMMARY OF THE INVENTION

Briefly, the invention provides a method and apparatus that includes a micro processor having a bus fraction register with an encoding which when decoded indicates either a bus fraction encoding or a stop clock function, data processing logic that includes a number of units arranged as an instruction pipeline, the units being clocked by an internal clock running at a first frequency and operating with an I/O bus clocked by an I/O clock running at a second frequency driven by a phase locked loop (PLL) clock, the second frequency being a fraction of the first frequency, one of the units being a bus unit which controls bus cycles in the pipeline and generates a bus unit busy (BBSY) signal upon the condition that the bus unit is busy with bus cycles.

A stop clock signal is generated upon the condition that the bus fraction register contains the stop clock encoding and the bus unit busy (BBSY) signal line is polled to ensure that all pending bus cycles in the pipeline are completed, the polling being initiated in response to the stop clock signal. Next, a special cycle encoded to indicate the stop clock function is run to inform the system that the internal clock and the I/O clock are going to stop toggling. The internal clock and the I/O clock are signaled to stop. Finally a number of no operation NOP micro instructions are executed, the number being determined by the amount of time required by the PLL clock to stop.

In accordance with an aspect of the invention, the bus fraction register is loaded with a default bus fraction of the first frequency in response to an external interrupt. When an external interrupt occurs, it is latched by an external clock. The latched interrupt is used to awaken the PLL to run at the default fraction. The PLL takes a number of clock cycles to lock onto the default fraction, after which another special cycle is run to signify the event (that the PLL is locked). The interrupt latching is switched to the PLL clock to ensure that subsequent interrupts are latched by the PLL clock (normal interrupt handling).

In accordance with a further aspect of the invention, the bus fraction register is loaded with a bus fraction encoding. A bus fraction change occurs when the bus fraction register is found to contain the bus fraction encoding. The BBSY signal is polled to ensure that all pending bus cycles in the pipeline are completed. Once it is found that BBSY is not asserted, the PPL is signaled to change to the new bus fraction. The PLL takes a number of clock cycles to lock onto the new bus fraction after which a special cycle is run to indicate to the system that the PLL is locked onto the new bus fraction.

The invention has the advantage that the speed of a bus that operates at a fraction of the microprocessor core frequency can be changed or the clock can be stopped and restarted without having to reset the microprocessor.

The invention has the further advantage that a software visible register holds a new bus fraction which enables a user to program the bus fraction at which the external bus runs with respect to the core frequency.

DESCRIPTION OF THE DRAWINGS

The foregoing and other objects, features, and advantages of the invention will be apparent from the following more particular description of the preferred embodiments of the invention as illustrated in the accompanying drawings, wherein.

DESCRIPTION

Figure 1:
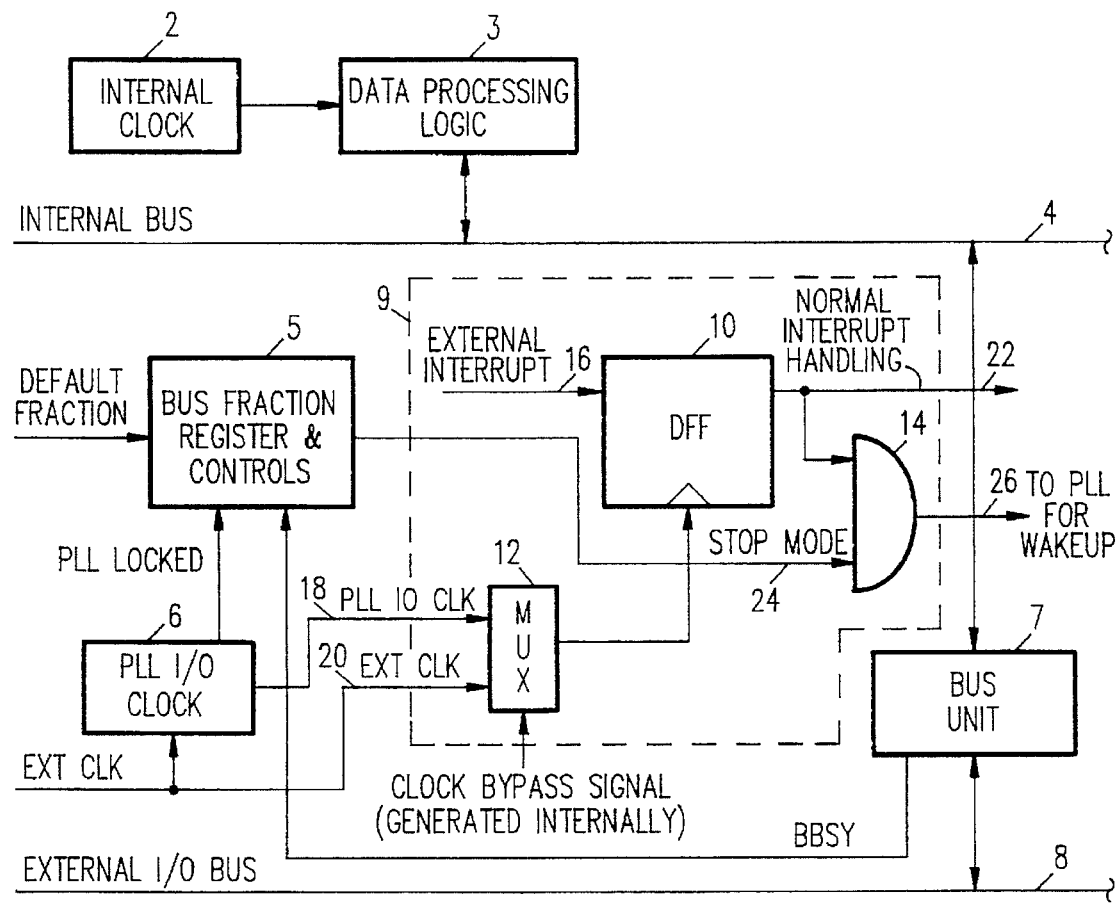
FIG. 1 is a diagram of logic to recognize a stop break event using a bypass MUX in the clock path.

Refer to FIG. 1 which is a diagram of a data processing system in which the present invention is embodied, including logic to recognize a stop break event (external interrupt). The system is more fully described in the above-referenced U.S. Pat. No. 5,471,587.

The micro processor shown in FIG. 1 includes a bus fraction register (5) with an encoding which when decoded indicates either a bus fraction encoding or a stop clock function. Data processing logic (3) includes a number of units arranged as an instruction pipeline, and the units are clocked by an internal clock (2) running at a first frequency. The traits operate with an I/O bus (8) clocked by an I/O clock (6) running at a second frequency, the second frequency being a fraction of the first frequency. A bus unit (7) controls bus cycles in the pipeline and generates a bus unit busy (BBSY) signal upon the condition that the bus unit is busy with bus cycles.

An external interrupt signal (16) is latched by the Ext clk (20) through the multiplexer MUX (12) into latch (10), the output (22) of which asserts one leg of AND (14). If the clock is in stop mode, the stop mode (24) asserts another leg of AND (14) which results in the output (26) being asserted to the PLL for wake up. Once the PLL is running, the PLL deasserts the stop mode (24). Subsequent external interrupts (16) are latched by the PLL I/O clock signal (18) through the MUX (12) into latch (10).

Figure 2:
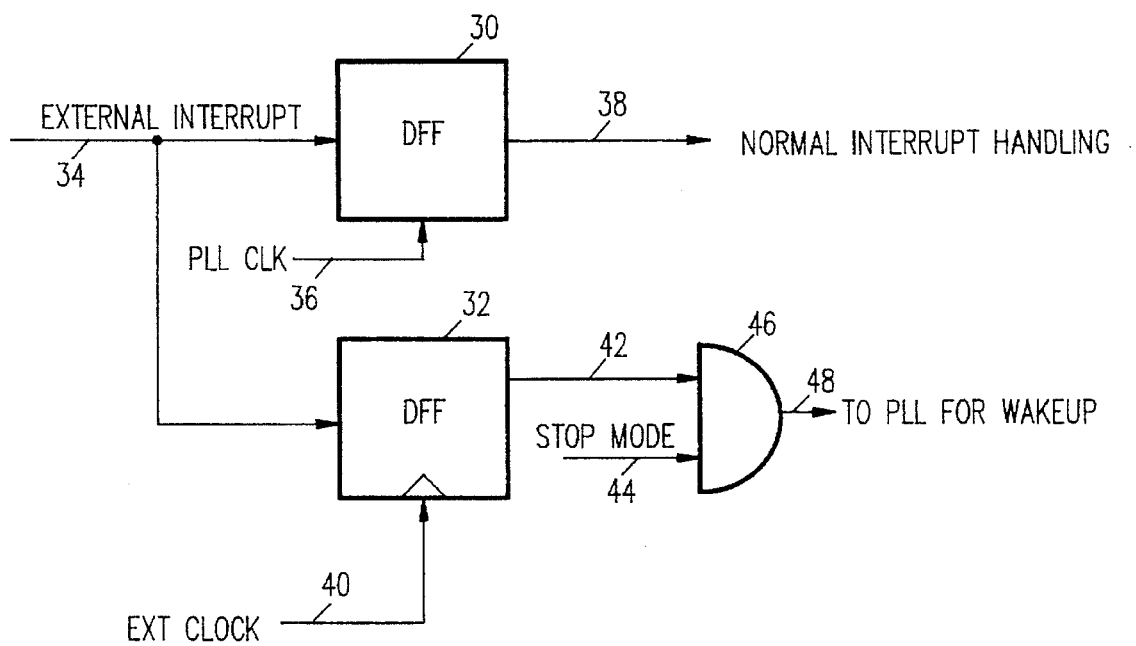
FIG. 2 is a diagram of logic to recognize a stop break event without a bypass MUX in the clock path.

Refer to FIG. 2 which is a diagram of a preferred embodiment of the invention, logic to recognize a stop break event (external interrupt). An external interrupt signal (34) is latched by the Ext clk (40) into latch (32), the output (42) of which asserts one leg of AND (46). If the clock is in stop mode, the stop mode (44) asserts another leg of AND (46) which results in the output (48) being asserted to the PLL for wake tip. Once the PLL is running, the PLL deasserts the stop mode (44). Subsequent external interrupts (34) are latched by the PLL I/O clock signal (36) into latch (30), the output (38) of which provides a signal to invoke normal interrupt handling.

Fractional Speed Bus

Several fractional speed bus modes can be chosen such that the external bus can run at a fraction of the core frequency of the internal processor logic. Additionally, a Stop Clock feature is also supported. Both of these features, bus fraction change and stop clock, are supported only when the processor is in system management mode (SMM). SMM is a special state of the micro processor for executing an interrupt handler.

The bus fraction is specified in a bus-fraction register. In micro processors that have Model Specific Registers (MSR), the bus-fraction register is added as another MSR. The bus fraction register is loaded on reset with an initial bus fraction obtained from a set of bond pads on the micro processor chip. The bus fraction can be changed by writing to this bus-fraction register using a Write Model Specific Register (WRMSR) instruction, with an appropriate encoding. The value written has to be other than zero encoding since a zero initiates a stop-clock sequence.

The processor has to be in SMM mode for the WRMSR instruction to be executed to load the bus-fraction register. If the processor is not in SMM mode, an illegal op code exception is generated. This is done to give these operations another level of protection.

Special Cycles

Figure 3:
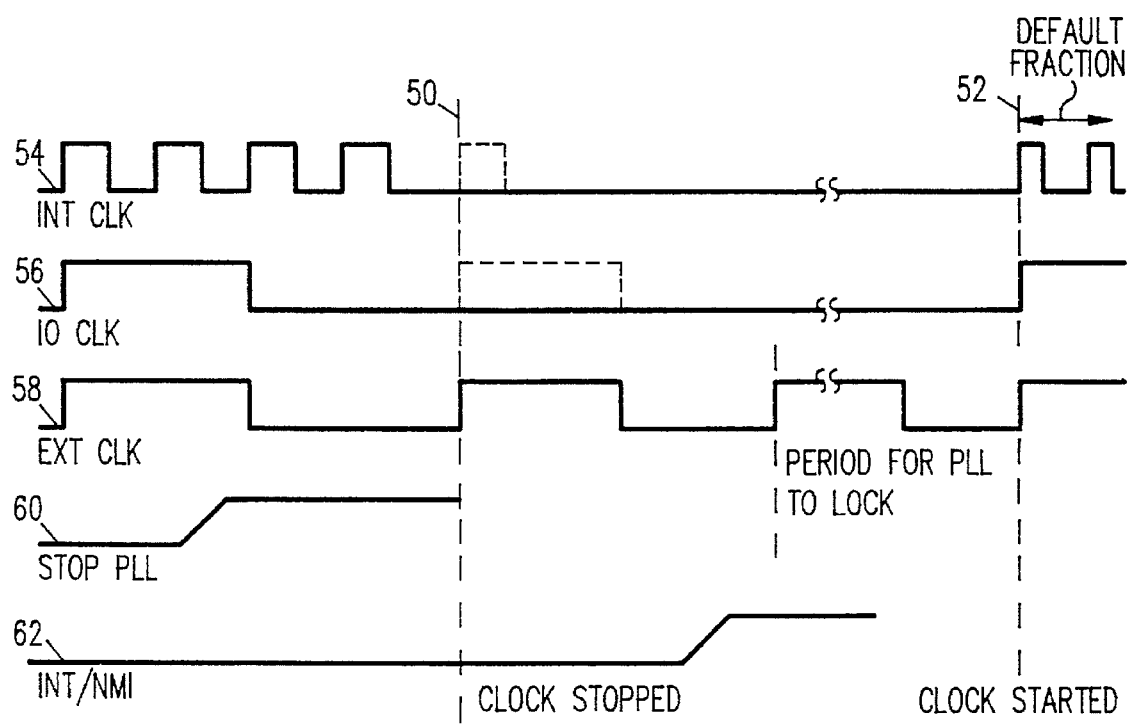
FIG. 3 is a timing diagram of a phase locked loop (PLL) clock stop and wake up with a default fraction at aligned clock edges.

Refer to FIG. 3. When a value has been written to the bus fraction register, the micro code examines the register and if all zeros are present the Stop PLL signal (60) is asserted. After a period of time, the clocks will stop toggling and will stop at an aligned edge (50) so that the clocks will wake up at an aligned edge to make the operation invisible to the user. The external clock (58) continues to toggle because it is not under control of the stop clock mechanism. A non-maskable interrupt (62) initiates the wake up. After a period for the PLL to lock to the external clock (58), the clock starts (52) at the next aligned edge of the external (58) and internal clocks (54).

Figure 4:
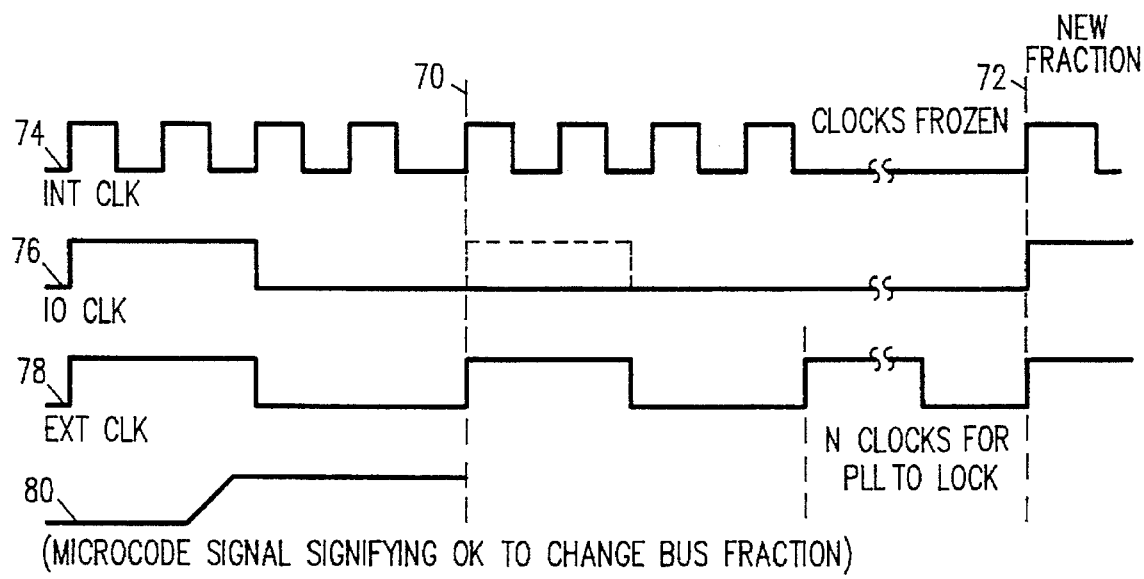
FIG. 4 is a timing diagram of a bus fraction change.

Refer to FIG. 4. When a non-zero value, which is an encoding for a valid bus fraction, is written into the bus fraction register, a similar sequence of events as in the stop clock case occurs before the PLL locks onto the new fraction.

The micro code generates a signal (80) to signify that it is permissible to change the bus fraction to the value in the bus fraction register. After a period of time, the I/O clock (76) will stop toggling and will stop at an aligned edge (70). It will take a number (n) of cycles of the external clock (78) for the PLL which drives the I/O clock to lock (72) onto the new bus fraction. A special cycle is then run to indicate to the system that the PLL has locked onto the new bus fraction.

In both cases, the internal clock is in a freeze state until the Phase Locked Loop (PLL) has locked onto a new bus fraction (for the bus fraction change case) or a default bus fraction (for the wake up case). After the PLL is locked, a special cycle is run in both cases to indicate either a change in bus fraction or a wake up from stop clock. Additionally, in the stop clock case, another special cycle is run prior to the clocks actually stopping.

The PLL remembers the current bus-speed fraction until the internal clock (54) is frozen. The reason for this is that the internal clock has to stop at an aligned edge (50) between the core clock (58) and the I/O clock (56), and start at an aligned edge (52) as well.

To ensure that the special cycle gets to run right after the PLL locking event and is not preempted by another pending cycle, all pending cycles are completed before the bus fraction is changed. This is achieved by the micro code which polls a bus unit busy signal (BBSY) to ensure that all pending cycles are out of the way before the internal-clock-freeze event occurs.

The pipeline is cleared before the internal clock is frozen. This is done by a no operation NOP instruction that has been placed in the micro code before the WRMSR. The NOP forces any instructions in the pipeline to complete before the WRMSR enters its executive stage.

The encoding for a non allowed bus fraction (currently anything other than ½, ⅓, ⅔, and 1) written to the bus fraction register will generate an illegal op code exception.

Stop Clock

A slop clock sequence is initiated by writing all zeros into the bus fraction register. During the stop-clock event, both the core (ext clk) and the I/O clock stop running, and the PLL is powered down.

The Stop-Clock Event

The processor has to be in SMM mode for the stop clock event to actually occur. The PLL stores the present bus fraction before the bus fraction register gets loaded with zeros. The PLL stops the clocks at aligned edge (50) and starts the clocks at aligned edge (52) shown in FIG. 3. The stop clock event will end upon recognition of an external interrupt. Since there is no internal clock at this point, the external clock must recognize the event, as shown in FIG. 1 and FIG. 2.

The PLL clocks freeze and awake at aligned edges. The PLL clocks wake up and are started with the default fraction. This is illustrated in the timing diagram of FIG. 3.

Bus Fraction Change and Stop Clock Micro Code Flow

Figure 5:
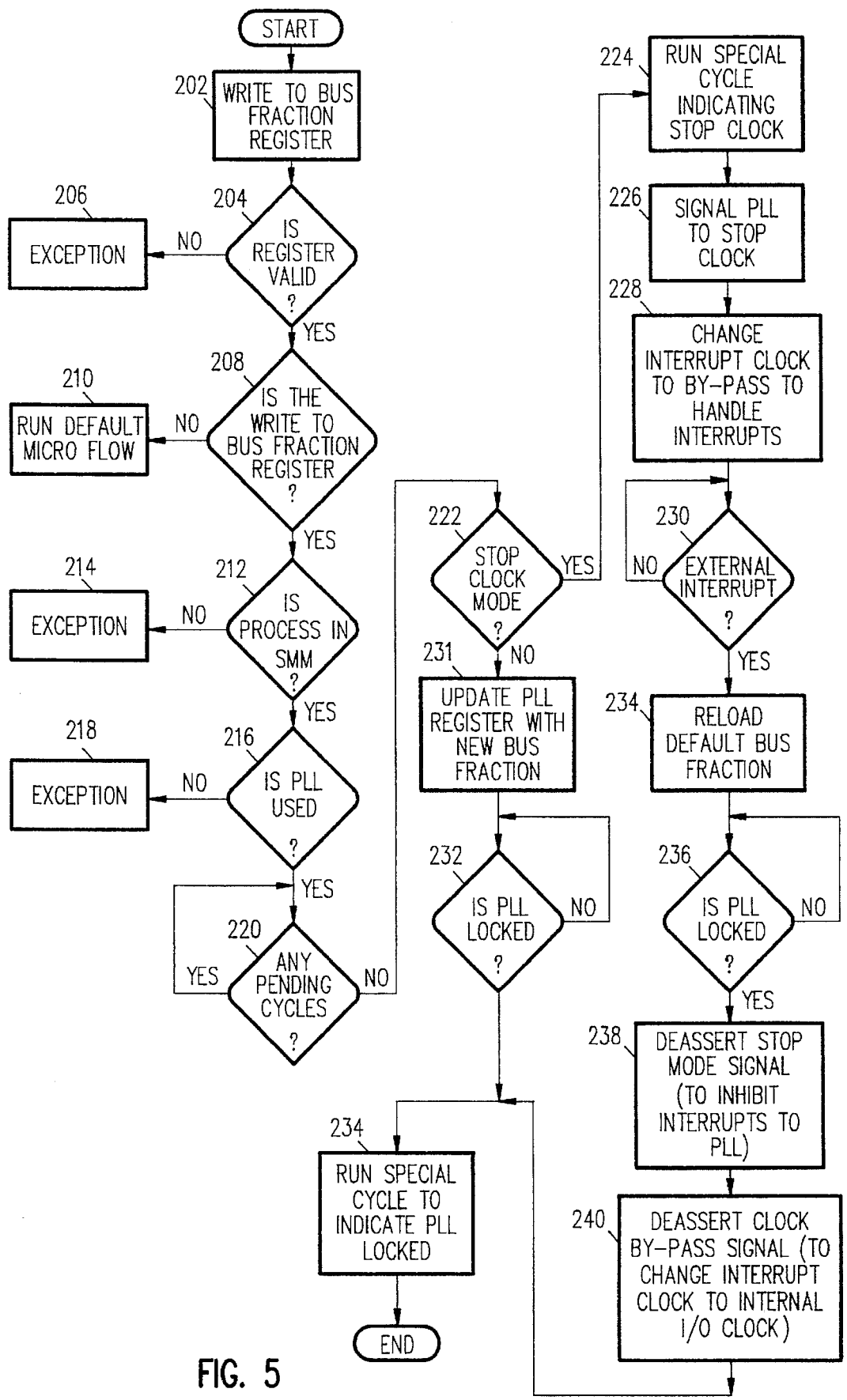
FIG. 5 is a flow diagram for bus fraction change and stop clock.

FIG. 5 is a flow diagram for the WRMSR instruction, including both bus fraction change, slop clock, and wake up. The flow begins with a write to the bus fraction register (202). A check is made to see if what was written to the bus fraction register is a valid encoding: is the register valid? (204). If no, then an exception is taken (206). If yes, there are two possibilities, it could be a stop clock encoding or a bus fraction change encoding. The flow proceeds to the decision block (208) to determine if the write is to the bus fraction register. If no, then a default micro flow is run (210). If yes, the flow proceeds to the decision block (212) to determine if the process is in SMM. Because changing the bus fraction or stopping the clock are major events, they are restricted to being allowed to occur only in system management mode (SMM), for protection. If no, then an exception is taken (214). If yes, the flow proceeds to a check to see if the PLL is being used (216). This is a check to see if the system is running from the internal clock (PLL) or the external clock. If no, then an exception is taken (218). If yes, the flow proceeds to check if there is a pending cycle (220) in the pipeline by polling the BBSY signal. If, yes, then the logic waits until the BBSY signal is deasserted. If no, the flow proceeds to a check the encoding to see if it is for stop clock or bus fraction change.

If in the stop clock mode, a special cycle is run to communicate the stop clock event (224) to the system. A signal is then sent to the PLL to stop (226). The interrupt clock is changed to by-pass, in order to handle interrupts (228).

If bus fraction change is encoded, a no from the decision block (222), the PLL register is updated with a new bus fraction (230). Once the PLL is locked (232) a special cycle is run to communicate to the system that the PLL is locked (224).

Wake up Micro Code Flow

To wake up and restart the clock, the bus fraction register is loaded with a default bus fraction of the first frequency in response to an external interrupt. When the external interrupt occurs, it is latched by the external clock. The latched interrupt is used to awaken the PLL to run at the default fraction. (The PLL takes a number of clock cycles to lock onto the default fraction, after which another special cycle is run to signify that the PLL is locked. The interrupt latching is switched to the PLL clock to ensure that subsequent interrupts are latched by the PLL clock (normal interrupt handling).

Wake up to restart the clocks occurs after the PLL has received an external interrupt (230). In response to the interrupt, the default bus fraction is reloaded (234). The micro code then waits until the PLL is locked (236). When the PLL is locked, the flow proceeds to deassert the stop mode signal (238) in order to inhibit interrupts to the PLL Next the bypass signal is deasserted (240) to change the interrupt clock to the internal I/0 clock, so an external interrupt is toggled by the PLL clock. Finally, a special cycle, encoded to indicate that the PLL is locked, is run (242). The PLL will always be powered down at a stop clock event.

Several modifications will be apparent to those skilled in the art. An option can be provided at reset that will allow the processor to run by either using the PLL clocks or the external (system) clock. A speed governor enable/disable feature may be provided as a bond option. In some parts the speed governor could work to limit the core frequency.

While the invention has been particularly shown and described with reference to preferred embodiments thereof, it will be understood by those skilled in the art that the foregoing and other changes in form and detail may be made therein without departing from the scope of the invention.

What is claimed is:

1. In a micro processor including a bus fraction register, data processing logic that includes a number of units arranged as an instruction pipeline, one of said units being a bus unit that controls bus cycles in said pipeline, said bus unit asserting a bus unit busy signal line upon a condition that a bus cycle unit is underway, said units being clocked by an internal clock running at a first frequency and operating with an I/O bus clocked by an I/O clock running at a second frequency driven by a phase locked loop (PLL), said second frequency being a fraction of said first frequency, said bus fraction register having a contents set to an initial state indicating a default bus clock speed, a method comprising steps of:

A. writing an encoded value to said bus fraction register, said encoded value placing said contents of said bus fraction register in either a first state or a second state, said first state indicating a first bus clock speed of said I/O clock and said second state indicating a second bus clock speed of said I/O clock;
   B. decoding said bus fraction register contents to determine if said encoded value is in said initial state, in said first state, or in said second state;
   C. examining said bus unit busy signal line;
   D. generating a stop PLL signal to said PLL upon a condition that said bus fraction register value is in said first state or in said second state and a condition that said bus unit busy signal line is not asserted; and
   E. loading said PLL with said contents of said bus fraction register upon a condition that said bus fraction register value is in said first state or said second state and a condition that said bus unit busy signal line is not asserted.

2. The method in accordance with claim 1 further comprising steps of:

F. running a special cycle on said I/O bus to indicate that said PLL is locked.

3. The method in accordance with claim 1 further comprising steps of:

F. loading said bus fraction register with an encoded value that changes said contents to said initial state indicating a default bus clock speed in response to an external interrupt, upon a condition that said contents of said bus fraction register are in said second state.

4. The method in accordance with claim 2 further comprising steps of:

G. loading said bus fraction register with an encoded value that changes said contents to said initial state indicating a default bus clock speed in response to an external interrupt, upon a condition that said contents of said bus fraction register are in said second state.

5. In a micro processor including a bus fraction register having an encoded value stored therein, said encoded value placing a contents of said bus fraction register in either an initial state, a first state or a second state, said initial state indicating a default bus clock speed, said first state indicating a first bus clock speed and said second state indicating a second bus clock speed, data processing logic that includes a number of units arranged as an instruction pipeline, said units being clocked by an internal clock running at a first frequency and operating with an input/output (I/0) bus clocked by an I/O clock running at a second frequency, said second frequency being a fraction of said first frequency, one of said units being a bus unit which controls bus cycles in said pipeline and generates a bus unit busy (BBSY) signal upon a condition that said bus unit is busy with bus cycles, a method comprising the steps of:

A. generating a stop clock signal upon a condition that said contents of said bus fraction register is in said first state or said second state;
   B. polling said bus unit busy (BBSY) signal line to determine if said BBSY signal line is asserted or not asserted, said polling being initiated in response to said stop clock signal;

C. asserting a stop mode signal upon a condition that said contents of said bus fraction register is in said second state and upon a condition that said BBSY signal line is not asserted;

D. signaling said internal clock and said I/O clock to stop in response to a no operation (NOP) micro instruction placed in said pipe line, to indicate that said pipeline is clear of pending instructions; and, E. executing a number of NOP micro instructions, the number being determined by the amount of time required by said I/O clock to stop.

6. The method in accordance with claim 5 further comprising steps of:

F. setting said bus fraction register to said initial indicating a default bus clock speed in response to an external interrupt;

G. generating a locked signal upon a condition that said I/O clock is locked;

H. deasserting said stop mode signal in response to said locked signal in order to inhibit interrupts to said I/O clock;

I. changing said interrupt clock to said I/O clock, so that an external interrupt is toggled by said I/O clock; and, J. running a special cycle on said I/O bus to indicate that said I/O clock is locked.

7. A clock apparatus comprising:

a bus fraction register logic which stores an encoded value which indicates either an initial state indicating a default bus clock speed, a first state indicating a first bus clock speed or a second state indicating a second bus clock speed;

said bus fraction register logic including a decoder for decoding said encoded value and for asserting a stop mode line upon a condition that said first state or said second state is decoded;

an internal clock that runs at a first frequency;

an internal bus clocked by said internal clock;

an input/output clock that runs at a second frequency, said second frequency being a fraction of said first frequency;

an input/output bus clocked by said input/output clock;

a data processing logic connected to said internal bus, said data processing logic including a number of units arranged as an instruction pipeline, said units being connected to said internal bus;

an external clock;

a phase-locked loop clock connected to and driven by said external clock;

said phase-locked loop clock having a wakeup input for starting operation of said phase-locked loop clock;

said phase-locked loop clock storing a bus fraction value that sets the operating frequency of said phase-locked loop clock;

an external interrupt signal line;

wakeup logic connected to said external interrupt signal line, to said stop mode line and to said external clock, said wakeup logic having a wakeup output that is asserted upon a condition that said external interrupt signal line is asserted and said stop mode line is asserted; and said wakeup output being connected to said wakeup input of said phase-locked loop clock.

8. The apparatus in accordance with claim 7 wherein said wakeup logic comprises:

a latch connected to said external interrupt signal line and to said external clock for recognizing an external interrupt;

said latch having a normal interrupt handling output;

an AND having a first input, a second input and an output;

said first input of said AND being connected to said stop mode line; said second input of said AND being connected to said normal interrupt handling output;

said output of said AND being connected to said wakeup input of said phase-locked loop clock.

9. The apparatus in accordance with claim 7 further comprising:

a locked signal line; and, wherein said phase-locked loop clock asserts said locked signal line upon a condition that said phase-locked loop is locked onto said external clock; and, said bus fraction register logic unasserts said stop mode line in response to said locked signal line being asserted.

10. The apparatus in accordance with claim 7 further comprising:

a bus unit connected to said internal bus and to said input/output bus for controlling bus cycles in said instruction pipeline; and, a bus busy line connected to said bus unit and to said bus fraction register logic;

said bus unit asserting said bus unit busy signal upon a condition that said bus unit is busy with bus cycles;

said bus fraction register logic being responsive to said bus busy input to prevent said stop mode signal from being asserted for as long as said bus busy input is asserted.

11. The apparatus in accordance with claim 8 further comprising:

a locked signal line; and, wherein said phase-locked loop clock asserts said locked signal line upon a condition that said phase-locked loop is locked onto said external clock; and, said bus fraction register logic unasserts said stop mode line in response to said locked signal line being asserted.

12. The apparatus in accordance with claim 8 further comprising:

a bus unit connected to said internal bus and to said input/output bus for controlling bus cycles in said instruction pipeline; and, a bus busy line connected to said bus unit and to said bus fraction register logic;

said bus unit asserting said bus unit busy signal upon a condition that said bus unit is busy with bus cycles;

said bus fraction register logic being responsive to said bus busy input to prevent said stop mode signal from being asserted for as long as said bus busy input is asserted.

13. A clock apparatus comprising:

a bus fraction register logic means which stores an encoded value which indicates either an initial state indicating a default bus clock speed, a first state indicating a first bus clock speed or a second state indicating a second bus clock speed;

said bus fraction register logic means including a decoder for decoding said encoded value and for asserting a stop mode line upon a condition that said first state or said second state is decoded;

an internal clock means for providing at a first frequency;

an internal bus clocked by said internal clock;

an input/output clock means for providing a second frequency, said second frequency being a fraction of said first frequency;

an input/output bus clocked by said input/output clock;

a data processing logic means connected to said internal bus, said data processing logic including a number of units arranged as an instruction pipeline, said units being connected to said internal bus;

an external clock;

a phase-locked loop clock means connected to and driven by said external clock;

said phase-locked loop clock means having a wakeup input for starting operation of said phase-locked loop clock;

said phase-locked loop clock including means for storing a bus fraction value for setting the operating frequency of said phase-locked loop clock;

an external interrupt signal line;

wakeup logic means connected to said external interrupt signal line, to said stop mode line and to said external clock, said wakeup logic having a wakeup means for asserting a wakeup output upon a condition that said external interrupt signal line is asserted and said stop mode line is asserted; and said wakeup output being connected to said wakeup input of sake phase-locked loop clock means.

14. The apparatus in accordance with claim 13 wherein said wakeup logic means comprises:

recognizing means connected to said external interrupt signal line and to said external clock for recognizing an external interrupt;

said recognizing means having a normal interrupt handling output;

an AND having a first input, a second input and an output;

said first input of said AND being connected to said stop mode line;

said second input of said AND being connected to said normal interrupt handling output;

said output of said AND being connected to said wakeup input of said phase-locked loop means.

15. The apparatus in accordance with claim 13 further comprising:

a locked signal line; and, wherein said phase-locked loop means asserts said locked signal line upon a condition that said phase-locked loop is locked onto said external clock; and, said bus fraction register logic means unasserts said stop mode line in response to said locked signal line being asserted.

16. The apparatus in accordance with claim 13 further comprising:

a bus unit means connected to said internal bus and to said input/output bus for controlling bus cycles in said instruction pipeline; and, a bus busy line connected to said bus unit means and to said bus fraction register logic;

said bus unit means asserting said bus unit busy signal upon a condition that said bus unit is busy with bus cycles;

said bus fraction register logic means including inhibiting means responsive to said bus busy input for preventing said stop mode signal from being asserted for as long as said bus busy input is asserted.

17. The apparatus in accordance with claim 14 further comprising:

a locked signal line; and, wherein said phase-locked loop means asserts said locked signal line upon a condition that said phase-locked loop is locked onto said external clock; and, said bus fraction register logic unasserts said stop mode line in response to said locked signal line being asserted.

18. The apparatus in accordance with claim 14 further comprising:

a bus unit connected to said internal bus and to said input/output bus for controlling bus cycles in said instruction pipeline; and, a bus busy line connected to said bus unit and to said bus fraction register logic;

said bus unit means asserting said bus unit busy signal upon a condition that said bus unit is busy with bus cycles;

said bus fraction register logic means including inhibiting means responsive to said bus busy input for preventing said stop mode signal from being asserted for as long as said bus busy input is asserted.

19. In a processor including a bus fraction register having a first state or a second state, said first state indicating a first bus clock speed and said second state indicating a second bus clock speed, a bus unit which controls bus cycles for said processor and generates a bus unit busy signal upon a condition that said bus unit is busy with bus cycles, a method comprising the steps of:

A. generating a stop clock signal;

B. polling said bus unit busy signal to determine if said bus unit busy signal is asserted or not asserted, said polling being initiated in response to said stop clock signal;

C. asserting a stop mode signal upon a condition that said contents of said bus fraction register is in said second state and upon a condition that said bus unit busy signal is not asserted; and D. signaling an internal clock and an input/output (I/O) clock to stop in response to a no operation (NOP) micro instruction placed in a pipeline of the processor, to indicate that said pipeline is clear of pending instructions, wherein said internal clock is running at a first frequency and said I/O clock is running at a second frequency, said second frequency being a fraction of said first frequency.

20. The method in accordance with claim 19 further comprising steps of:

E. executing a number of NOP micro instructions, the number being determined by the mount of time required by said I/O clock to stop.

21. An apparatus comprising:

a bus fraction register which stores an encoded value indicating a first state or a second state, the first state indicating a first bus clock speed and the second state indicating a second bus clock speed;

a data processing logic coupled to an internal bus, said data processing logic including a number of units arranged as an instruction pipeline, said units being coupled to said internal bus;

an external clock;

a phase-locked loop clock coupled to and driven by said external clock;

said phase-locked loop clock having a wakeup input for starting operation of said phase-locked loop clock;

said phase-locked loop clock storing a bus fraction value that sets the operating frequency of said phase-locked loop clock;

an external interrupt signal line;

wakeup logic coupled to said external interrupt signal line, to said stop mode line and to said external clock, said wakeup logic having a wakeup output that is asserted upon a condition that said external interrupt signal line is asserted and said stop mode line is asserted;

said wakeup output being coupled to said wakeup input of said phase-locked loop clock;

an internal clock that runs at a first frequency;

said internal bus being clocked by said internal clock;

An input/output clock that runs at a second frequency, said second frequency being a fraction of said first frequency; and said input/output bus being locked by said input/out clock.

* * * * *